(12) United States Patent
Terada

(10) Patent No.: US 6,278,845 B1
(45) Date of Patent: Aug. 21, 2001

(54) CAMERA INCORPORATING A FLASH LIGHT ILLUMINATION DEVICE

(75) Inventor: Hiroshi Terada, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/638,629

(22) Filed: Aug. 14, 2000

(30) Foreign Application Priority Data

Aug. 27, 1999 (JP) ................................. 11-241913

(51) Int. Cl.[7] .......................... G03B 15/03; G03B 15/06; G03B 13/02; G03B 13/08
(52) U.S. Cl. ......................... 396/175; 396/176; 396/384; 396/385
(58) Field of Search ................................. 396/176, 186, 396/199, 200, 373, 378, 384, 385, 431, 175

(56) References Cited

U.S. PATENT DOCUMENTS

| | | | |
|---|---|---|---|
| 2,947,216 | * | 8/1960 | Drews .................................. 351/206 |
| 4,279,488 | * | 7/1981 | Hines .................................. 396/176 |
| 5,050,044 | | 9/1991 | Shibayama . | |

FOREIGN PATENT DOCUMENTS

| | | |
|---|---|---|
| 5-289154 | 11/1939 | (JP) . |
| 63-257735 | 10/1988 | (JP) . |

\* cited by examiner

*Primary Examiner*—Russell Adams
*Assistant Examiner*—Arthur A. Smith
(74) *Attorney, Agent, or Firm*—Frishauf, Holtz, Goodman, Langer & Chick, P.C.

(57) ABSTRACT

In the present invention, flash light is illuminated through a finder optical system and thereby the user can be notified of the moment of release operation. The camera size can be reduced by the following layout of the finder unit and the flash unit. This camera has a finder unit having a finder optical system (object lens group, mirror, prism and finder eyepiece window) and a flash unit including, for example, a midget bulb-type flash light illumination unit (discharge tube) and a reflector, which comprise the optical system for flash light illumination. A movable mirror is mounted and properly controlled so that part of the light path of the finder optical system (object lens group) also serves selectively as part of the light path of the optical system (object lens group) for flash light illumination. The above flash light illumination unit is installed behind the mirror on the extended optical axis of the object lenses.

17 Claims, 6 Drawing Sheets

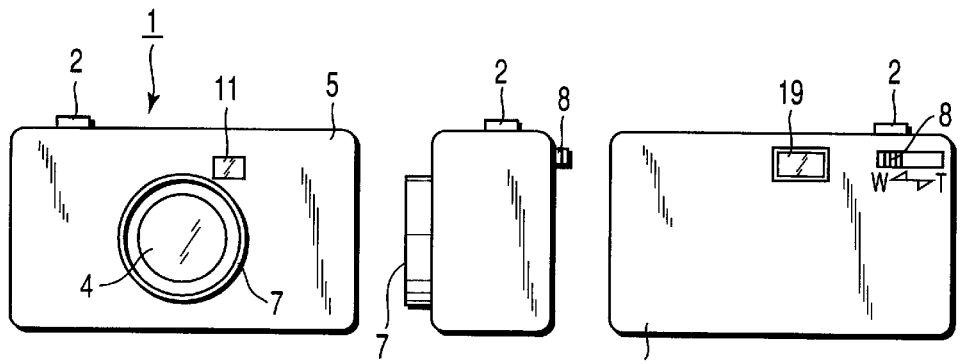
FIG. 3A  FIG. 3B  FIG. 3C
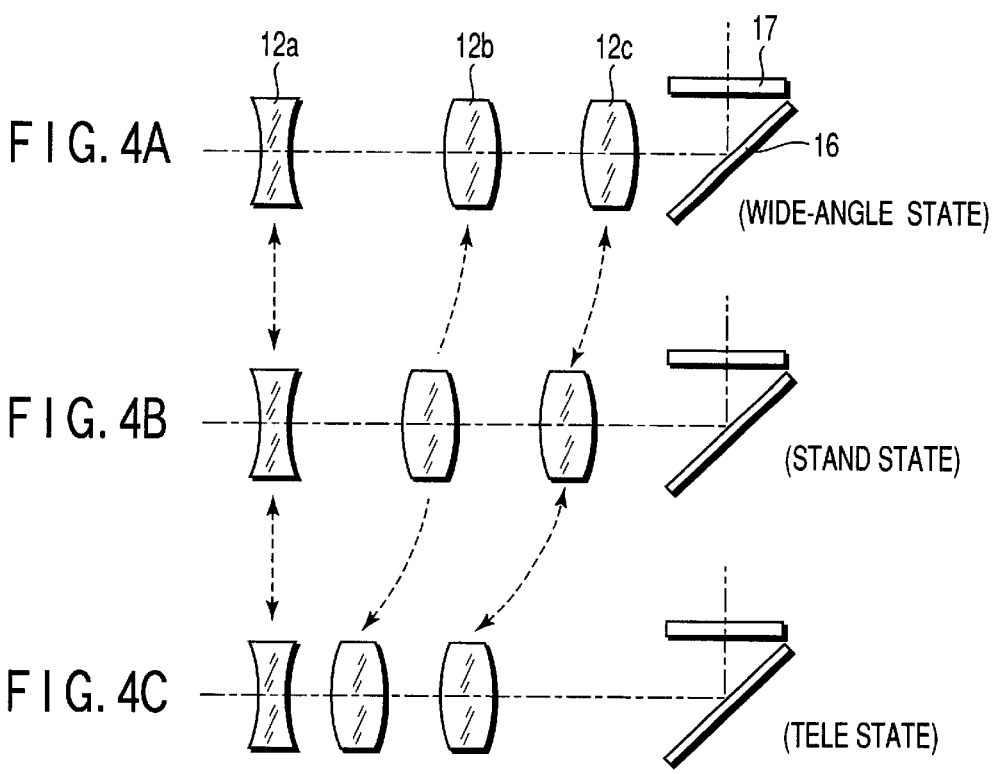
FIG. 4A (WIDE-ANGLE STATE)
FIG. 4B (STAND STATE)
FIG. 4C (TELE STATE)
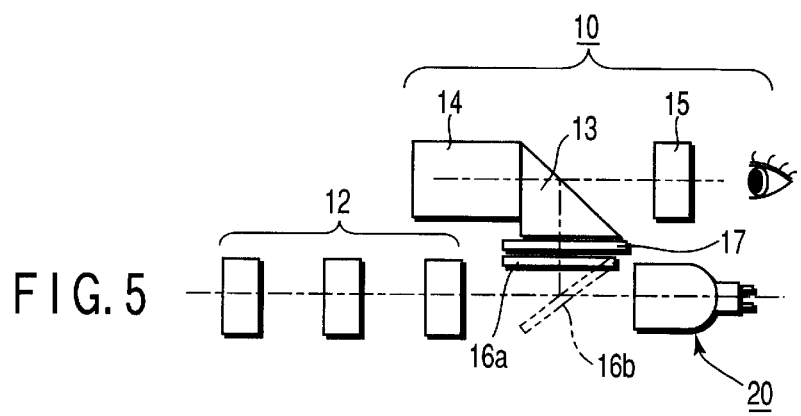
FIG. 5

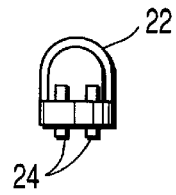
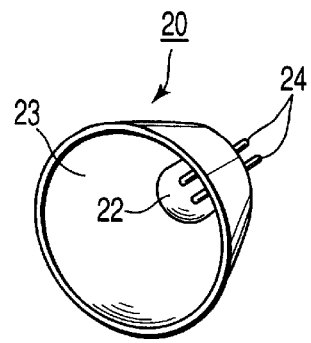
FIG. 6A  FIG. 6B  FIG. 6C
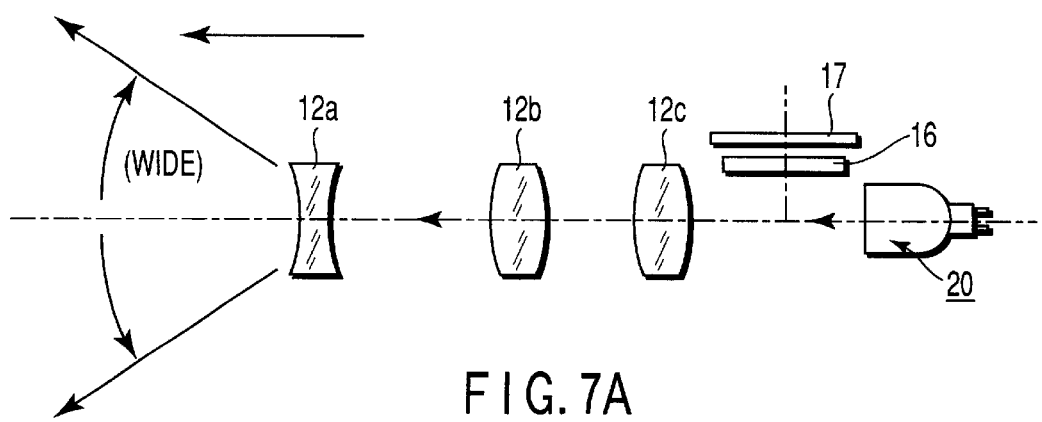
FIG. 7A
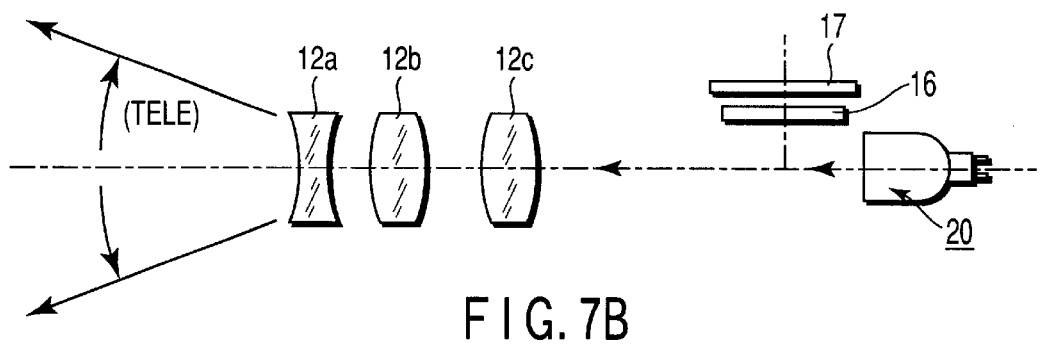
FIG. 7B

CAMERA INCORPORATING A FLASH LIGHT ILLUMINATION DEVICE

CROSS-REFERENCE TO RELATED APPLICATIONS

This application is based upon and claims the benefit of priority from the prior Japanese Patent Application No. 11-241913, filed Aug. 27, 1999, the entire contents of which are incorporated herein by reference.

BACKGROUND OF THE INVENTION

The present invention relates to cameras having viewfinders and flash units on their front covers.

Related to camera flash units, some technologies have been proposed in recent years that allow to make flash units compact and change the flash illumination angle. For example, the flash unit disclosed in a Japanese Patent Application, KOKAI Publication No. 63-257735, has a structure that enables to control the flash illumination angle and light distribution by moving a xenon flash lamp tube, which is a midget light bulb mounted in the flash illumination unit, back and forth along the optical axis inside a reflector.

In most of the architectures related to cameras incorporating relatively compact flash units, as exemplified by the above invention, the flash window is located right above or right beside the viewfinder.

Some of the lens shutter cameras have scaling functions in their view finders with which users can observe the target with a scale equal to that used upon exposure, when they zoom in or out on the target in taking pictures.

In those prior art cameras, the flash light comes out from an internal flash unit through a dedicated flash window. This flash window, in many cases, is separately located apart from the viewfinder, and the flash window and the viewfinder are laid out adjacent to each other on the front cover.

However, in order to use a flash unit upon zooming in or out on a subject, an illumination angle adjusting mechanism specifically designed for the flash unit must be added that works in accordance with the focal length that has been set on each shooting scene. Further, if a flash unit is incorporated in a camera, a dedicated opening for the flash unit (namely, flash window) should be mounted on the front cover of the camera. However, it becomes difficult to provide compact cameras because the flash window becomes large along with increase in size of narrow xenon lamp tubes and accordingly the front cover becomes large, if such a large flash window is located right above or right beside the viewfinder.

Components layout on the front cover of a camera affects the convenience and look of the camera. In addition to the layout of the front lens, the viewfinder and the flash window influence the size and impression of the camera as well.

In order to make cameras further compact than ever, the layout of the flash window and the viewfinder should be designed carefully.

Also in recent years, there is the need for cameras that allow the user to recognize the moment the shot is completed when the user pushes the release button down.

It is, therefore, the object of the present invention to provide a camera that permits the user to know the moment of release operation and presents a small size with an improved layout of the finder and the flash unit illuminating flash light from the viewfinder unit.

BRIEF SUMMARY OF THE INVENTION

To provide solutions to the above problems and accomplish the goals, the present invention takes the following actions. In the invention, a camera is provided that can illuminate flash light, which is emitted from a flash light illumination unit as a point light source, from the viewfinder by utilizing part of the optical system in the finder unit.

The camera according to the present invention has a finder optical system of which view range can be changed as desired by controlling the focal length of the object lens system through the use of a plurality of object lens groups that are movable along the optical axis. The camera is also featured by a structure in which the flash light source of its flash light illumination unit is incorporated in the camera in a position behind the object lens system on the optical axis of the object lens system in the finder optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A–3C illustrate the external view of a camera according to the invention, FIG. 3A being a front view of the camera which is ready for use, FIG. 3B its side view and FIG. 3C its rear view;

FIGS. 4A–4C illustrate how the zooming mechanism in the finder optical system of a camera according to the invention works, FIG. 4A illustrating an array of the optical elements for wide-angle shooting, FIG. 4B an array of the optical elements for standard shooting, and FIG. 4C an array of the optical elements for telescopic shooting;

FIG. 5 is a side view illustrating a structural feature of the finder optical system and flash unit of a camera according to the invention;

FIGS. 6A–6C illustrate the flash light illumination unit of a camera according to the invention, FIG. 6A being a top view of the discharge tube used in the flash unit, FIG. 6B a side view of this discharge tube, and FIG. 6C a perspective view illustrating the external view of the flash light illumination unit;

FIGS. 7A–7B illustrate the flash optical system and flash light illumination unit, FIG. 7A illustrating an array of lens elements for wide-angle shooting and FIG. 7B an array of lens elements for telescopic shooting;

DETAILED DESCRIPTION OF THE INVENTION

The present invention is now described below in detail along with preferred embodiments, referring to FIGS. 1–11.

Figure 1:
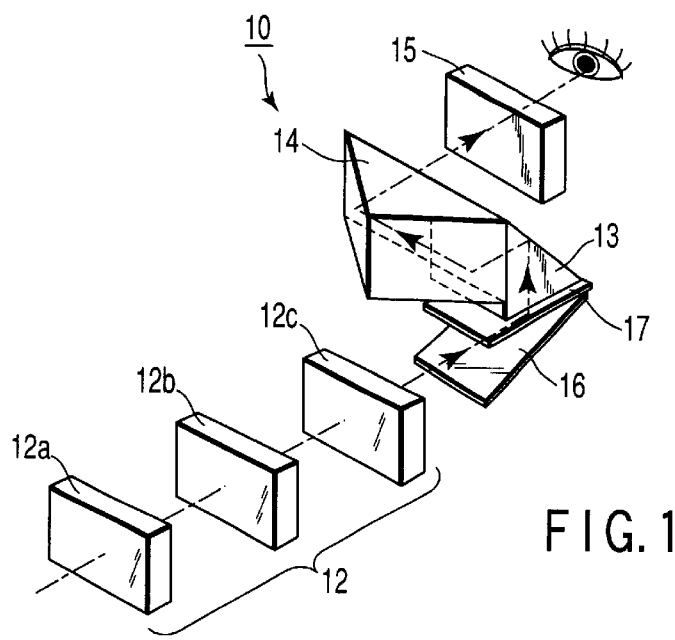
FIG. 1 is a perspective view of the major structure of the finder optical system of a camera according to the invention.

FIG. 1 is a perspective view of the major structure of the finder optical system of a camera according to the invention. What is shown here is the structure of the major part of a zoom finder system where a real image is formed on its optical path.

This zoom finder system consists of first-third groups of object lenses 12a, 12b and 12c, which comprise the object lens system of its optical system, a plurality of triangle prisms (first prism 13 and second prism 14), and an eyepiece system 15, as principal optical elements. In addition, a mirror 16 is mounted as a light path changing means that changes the light way by reflection. This mirror 16 is made rotatable so that it reflects the light that has come in straight through first-third object lenses 12a, 12b and 12c and switches the way of the light to a vertical direction selectively (to be explained in detail later).

Since real images are formed in this finder unit 10, a view frame 17 is inserted between the triangle prisms and the object lens system 12, adjacent to the mirror 16. To be more specific, the view frame 17 having a rectangle image forming plane is installed that contacts the bottom of the first prism 13, and the image of a target is formed on this plane.

Note that the shown state of the mirror 16 represents the component array in which an observation light path is formed when this optical system works as an optical system for the viewfinder.

When such finder unit 10 is mounted in a camera body, a finder window (11 in FIG. 3A) is formed in front of the first object lens group 12a of the object lens system 12, and a finder eyepiece window 19 is formed as well behind the eyepiece lens system 15 (refer to FIGS. 3A–3C).

Figure 2A:
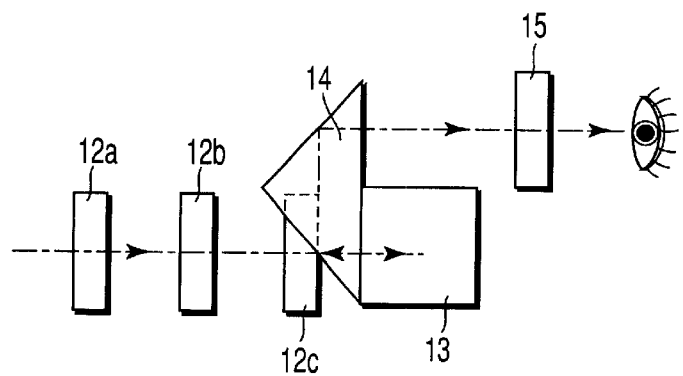
FIGS. 2A–2B illustrate the structure of the finder optical system and the flash optical system of a camera according to the invention, FIG. 2A being a top view of those optical systems and FIG. 2B a side view of those optical systems.
Figure 2B:
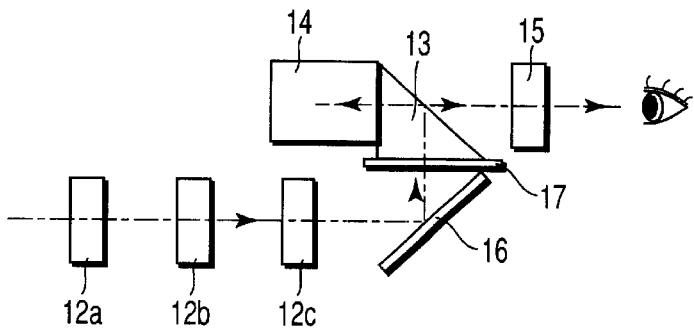

FIGS. 2A–2B illustrate the structure of the finder optical system of the above mentioned finder unit 10 and its optical path in a plan view and a side view. As described in the figures, the light that has passed 1st–3rd lens groups 12a, 12b and 12c of the finder optical system is reflected by 90 degrees by the mirror 16 to the vertical direction and forms the image of a target on the image forming plane. The light is again changed 90 degrees by the first prism 13. The light is then changed 90 degrees in the horizontal direction by a neighboring second prism 14 and then refracted 90 degrees before entering into an eyepiece lens system 15 to eventually reach the eye of the user.

In this way, the light path in the finder optical system of the finder unit 10 employing the real-image mode presents a bent light path comprising several portions parallel or perpendicular to the optical axis in the optical system including the front lens inside the camera cover.

Along this optically bent path of the finder optical system, there is a small space, for example, the space neighboring the object lens system 12 and the first prism 13, that allows a unit if it is small enough. In the camera according to the present invention, a small flash unit (20) is inserted in this small space in the finder optical unit 10, as described in detail later.

If the external view of a camera 1 according to the invention is demonstrated with a three-view drawing, FIG. 3A shows its front view under the state for wide-angle shooting, FIG. 3B the side view and FIG. 3C the rear view of the camera 1.

The rectangular finder window 11 of the finder unit 10 is formed in one piece together with the front cover 5. This window doubles as a flash light window of a flash unit (20 in FIG. 6C) that will be described later. This window is also located on an optical axis parallel to that of the front lens 4 in a cylinder 7 extruding on the front cover 5.

The front lens 4 in the cylinder 7 permits the user to zoom in/out on the target and the rectangle opening 11 (finder window) that works as both finder observation window and flash window is located on the camera cover as shown in the figures.

Referring now to FIG. 3C, the finder eyepiece window 19 is located near the central top of the rear cover 6 that houses the back of the camera 1. A zoom lever 8 that allows manual operation is mounted under the release button 2 near the top of the rear cover. This figure shows the camera state in which a wide-angle shooting is possible.

The zoom lever 8, mounted on the rear cover 6 of the camera 1, has a structure that enables to work with the finder in the range from wide-angle shooting to telescopic shooting by means of a sliding operation driven by a specific mechanism which will be described later.

Note that there is a difference in height between the finder window 11 and the finder eyepiece window 19 because the optical path of the finder optical system is bent in the vertical direction.

Since the finder window doubles as a flash window, the front side area of the camera 1 can be used efficiently and conveniently.

Next, FIGS. 4A–4C show an example of change in the finder optical system during zooming that employs a zoom finder mechanism. The lens array shown in FIG. 4A demonstrates a state ready for wide-angle shooting presented when a zooming operation is activated from the retracted state. In this state, second and third object lens groups 12b and 12c are located closest to the mirror 16 apart a predetermined distance. When zooming is activated from this state to reach the standard state shown in FIG. 4B, the second and third object lens groups 12b and 12c move toward the first lens group 12a keeping a predetermined distance, and later as shown in FIG. 4C, the first-third lens group 12 is located farthest from the mirror 16 to be ready for telescopic shooting.

In the following, the optical configuration according to the present invention will be described specifically that allows the flash optical system to also serve as the finder optical system in the camera 1.

FIG. 5 illustrates the structural feature of the camera according to the invention that utilizes part of the finder optical system.

Namely, in a small space located along the optical axis extended to the rear side of the mirror 16 that forms a bent light path in the finder unit 10, a flash unit 20 is installed which is a point light source small enough to fit in the small space.

The location of the flash unit 20 is almost equal to that of the view frame, namely, the position where real images are formed, with regard to the optical path length in the finder optical system.

When the finder unit 10 and the flash unit 20 are mounted in the camera, the finder window (11 in FIG. 3A) is formed in one piece together with the front cover in front of the object lens group 12, while on the other end of the finder optical path the finder eyepiece window 19 is formed in one piece together with the rear cover.

In the standard state, the mirror 16 sits in a position (16b) making 45 degrees against the optical axis, namely, "mirror down" as drawn with dot-dash lines, forming the finder optical path. However, when the release button is push down and immediately before flash light is illuminated, the mirror is raised up to a position (16a) drawn with solid lines, which is a position neighboring the view frame 17, to be ready for exposure and illuminate the flash light emitted from the flash unit 20 onto a target through the object lens group 12.

In the camera that employs such a real image mode, the finder unit 10 and the flash unit 20 are supported and fixed between the front and the rear covers, both of which form the external component of the camera 1, by a predetermined method.

Note that the material used in the above described windows can be a lens or flat plate.

As the flash unit 20 which is small enough to fit in such a small space, a unit is employed that has a small flash light component 22 shown in FIGS. 6A–6C. Namely, the flash unit employs a midget light bulb as the discharge tube for its flash light component. This flash light component has a reflector shade as shown in FIG. 6C that provides light beams emitted from this point light source after aligning the light beams almost in parallel along the light axis.

More specifically, this flash unit 20 equipped with a small light source 22, for example, a midget bulb-type xenon tube, emits flash light forward utilizing a lampshade like reflector 23. This midget bulb-type xenon tube 22 is connected to a power source (not shown) that supplies power to its input electrodes 24.

Next, FIGS. 7A and 7B show light paths of the flash unit that provide light spread suitable for wide-angle and telescopic shootings. In particular, the difference in the illumination angle is schematically demonstrated that depends on the viewfinder optical system used upon flash light illumination.

In the wide-angle state shown in FIG. 7A, the illumination angle is expanded by positioning the second and third object lens groups 12b and 12c of the object lens group 12 close to the mirror 16. On the other hand in the telescopic state shown in FIG. 7B, the illumination angle is narrowed by positioning the second and third object lens groups 12b and 12c close to the front-end first object lens group 12a.

Since the flash unit 20 is located at the position where images are formed in the viewfinder optical system, it can change the illumination angle efficiently in accordance with zooming operation, correlating it to the movement of the lens groups.

Figure 8A:
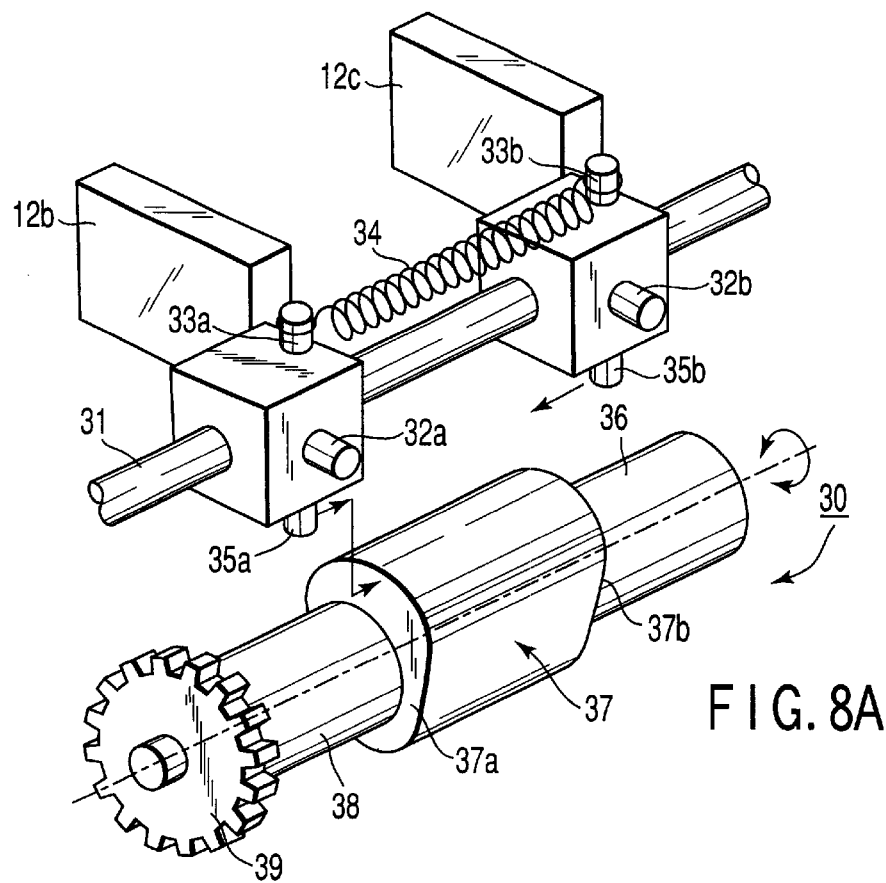
FIGS. 8A–8B illustrate a lens driving mechanism for controlling the lens array, FIG. 8A being a perspective view illustrating the structure of this lens driving mechanism and FIG. 8B a diagram illustrating schematically how this lens driving mechanism works.
Figure 8B:
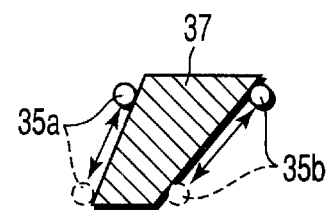

FIGS. 8A and 8B illustrate a lens driving mechanism 30 that controls the positions of the second and third object lens groups 12b and 12c.

Included in this lens driving mechanism 30 are a shaft 31 mounted along the optical axis and comprising part of a cam mechanism that moves in accordance with at least the second and third object lens groups 12b and 12c, guide-pins 32a and 32b mounted extruded on this shaft 31 that are apart a predetermined distance and can slide on the shaft, hook-pins 33a and 33b mounted extruded orthogonal to those guide-pins, a coil spring 34 hooked between those hook-pins and given a tension over the predetermined distance between the hook-pins, and cam-pins 35a and 35b which are apart the distance determined by the coil spring 34 and mounted extruded downwards.

In addition, included is a cam shaft 38 that is mounted in parallel to the shaft 31 and has a finder gear 39 on its one end that is rotated by a zoom motor (54a in FIG. 10) that provides zoom action to the front lens (not shown) and drives the aforementioned zoom finder. Also a finder cam 37 is formed in one piece with the cam shaft 38, which has specific curved finder cam surfaces 37a and 37b.

Detail description of the other parts is omitted here because they use architectures substantially the same as those open to the public.

FIG. 8B schematically illustrates how this lens driving mechanism works when the finder gear 39 rotates, developing the finder cam surfaces 37a and 37b which are formed on both sides of the finder cam 37 on a plane. Cam-pins 35a and 35b each slide on the finder cam surfaces 37a and 37b, respectively, with a given pressure, providing a combination of a cam mechanism and a cam follower that continuously changes the distance between the second and third object lens groups 12b and 12c.

Figure 9:
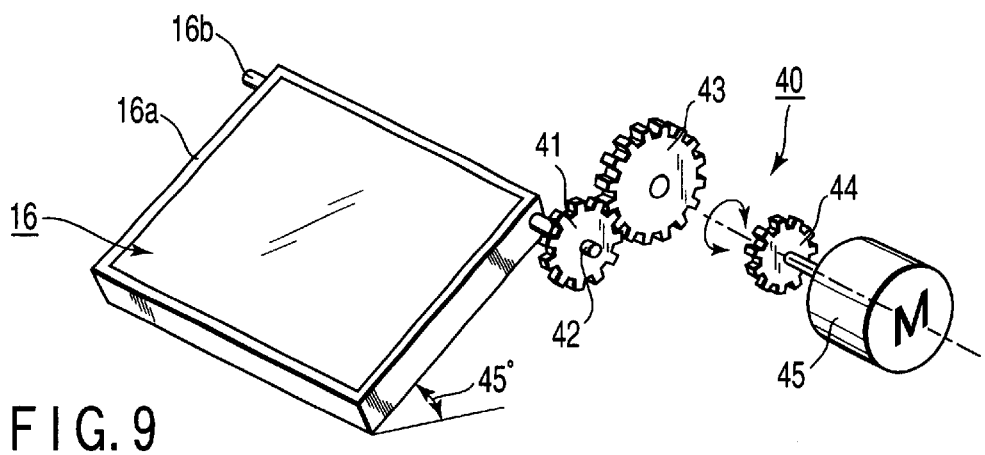
FIG. 9 is a perspective view schematically illustrating a mirror and mirror driving mechanism.

FIG. 9 shows a mirror 16, which is a means to change the light path, and a mirror driver mechanism 40 that controls the movement of this mirror 16. The mirror driver mechanism 40 has a mirror support pin 16b passing through one side of a mirror frame 16a surrounding the mirror 16. One end of this pin has a mirror rotation gear 41 and an idle gear 43 both of which move into engagement. A stepping motor 45, which has a pinion gear 44 in mesh with the idle gear 43, rotates back and forth to move the mirror support pin 16b by 45 degrees via the mirror rotation gear 41 and eventually provides "mirror up" and "mirror down" states of the mirror.

This mirror driver mechanism 40 is a mechanism exclusively designed to switch the finder optical path in the invention. Its structure, however, is based on substantially the same architecture as that open to the public, for example, the driver mechanism for quick return mirrors employed in single lens reflex cameras. The difference is that the mechanism employed in the present invention is manufactured small enough to fit in the finder unit 10 in order to change the finder optical path.

Detail description of the other parts is omitted because they use architectures substantially the same as those open to the public.

Figure 10:
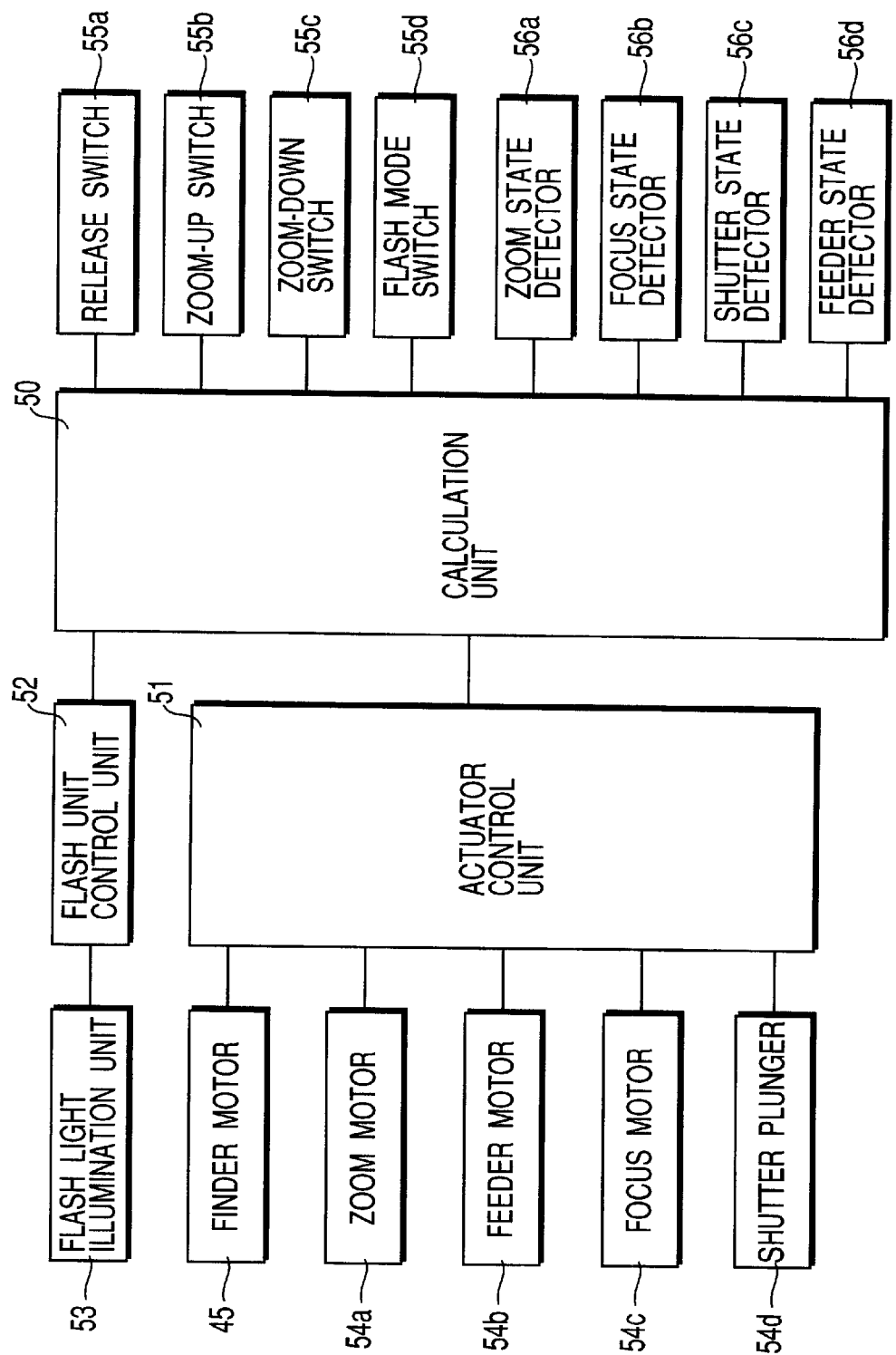
FIG. 10 is a block diagram schematically illustrating the structure of a camera according to the invention.

The block diagram shown in FIG. 10 schematically illustrates the structure of a camera according to the invention. To a calculation unit 50 that conducts an overall control of the camera, an actuator control unit 51 that controls actuators including motors 54a–54c and plunger 54e (referred to later) and a flash control unit 52 that controls the flash light illumination unit 53 are connected.

The actuator control unit 51 has a finder motor 45 that switches the finder optical path, a zoom motor 54a that provides zooming action of the front lens and moves the zoom finder, a feeder motor 54b for film advance, and other motors for focusing such as a focus motor 54c that employs a stepping motor, for example. In addition, a shutter plunger 54d is installed to be controllable for a shutter mechanism.

A flash light illumination unit 53 equipped with a discharge tube of a midget bulb-type is connected to the flash control unit 52.

The calculation unit 50 is equipped with a variety of switches such as a release SW 55a coupled with the release button 2, zoom-up SW 55b and zoom-down SW 55c coupled with the zoom lever 8, and a flash mode SW 55d that directs the use of flash light.

In addition, included are sensors such as a zoom state detection unit 56a that monitors the zooming state made by the zoom motor 54a, a focus detection unit 56b that monitors the focusing state made by the focus motor 54c, a shutter state detection unit 56c that monitors the shutter state made by the shutter plunger 54d, and a film advance state detection unit 56d that monitors the film feeding state made by the feeder motor 54b. The camera 1 according to the present invention operates based on a predetermined control program.

Figure 11:
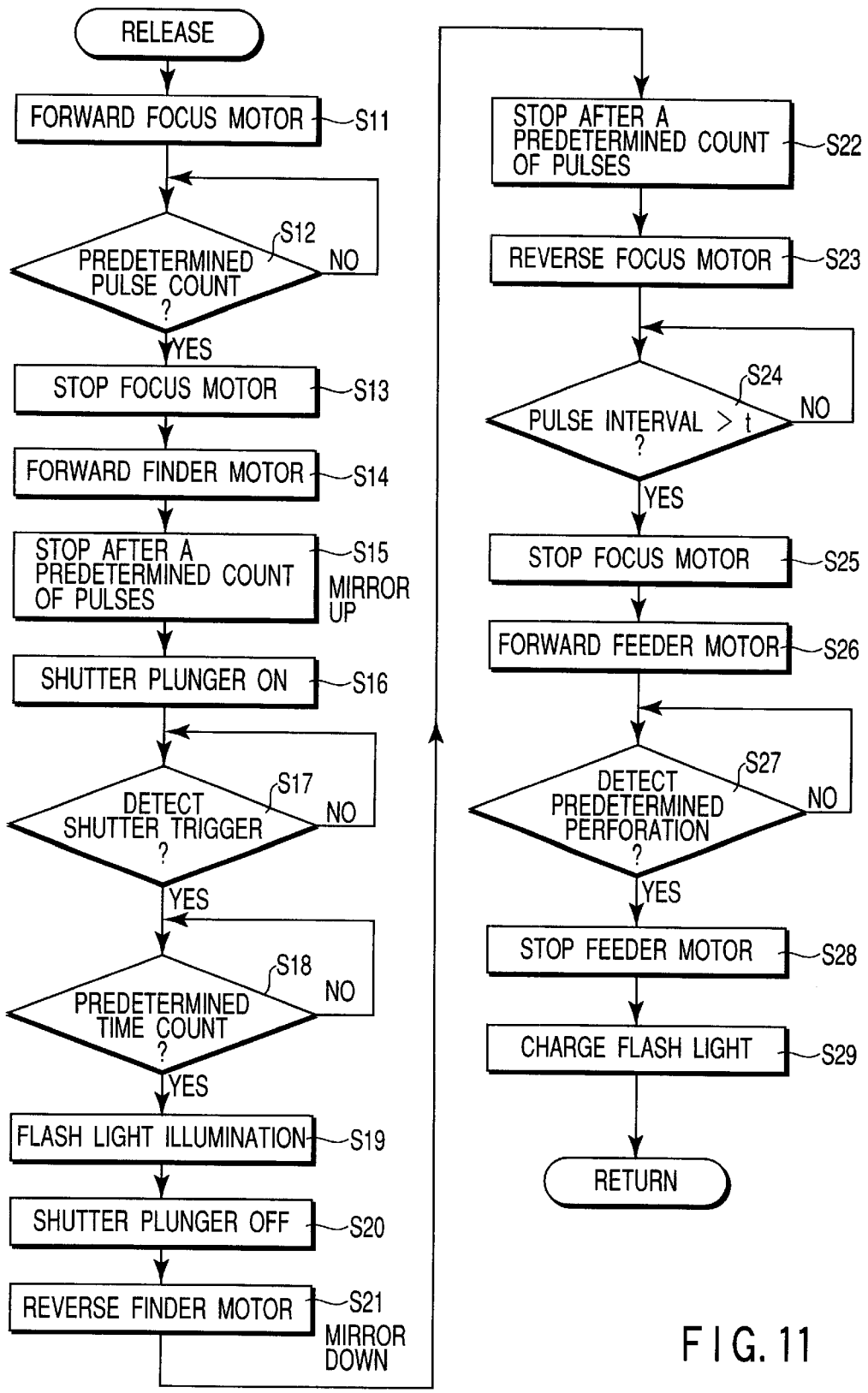
FIG. 11 is a flow chart schematically illustrating how a camera according to the invention works.

The flow diagram shown in FIG. 11 schematically illustrates the control program and its controlling procedures.

At step S11, the focus motor 54c employing a stepping motor rotates forward (S11).

A focusing operation (S12) is continued by this focus motor 54c until the number of pulse counts reaches a predetermined value that equates to the focus movement calculated by a metering means (not shown). Thereafter, when the number of pulses has reached the predetermined value, the focus motor 54c is stopped (S13).

At step S14, the finder motor 45 employing a stepping motor rotates forward to move up the mirror 16 to "mirror up" (S14). After the motor continues to rotate until the pulse count reaches a predetermined value, the motor stops and hold the mirror 16 in the mirror up state (S15).

Next at step S16, the shutter plunger 54d is turned on to move the shutter to open (S16) and detects the shutter trigger signal to measure how much time has passed since the reference moment (when triggered) (S17).

Thereafter, it counts a predetermined time (S18) that is obtained from an exposure calculation using an exposure circuit (not shown).

At step S18, when the predetermined time count is completed, the flash unit is activated and flash light is illuminated on the target via the switched flash light path (S19).

At step S20, the shutter plunger 54d is turned off to close the shutter (S20).

At step S21, the finder motor 45 is rotated backward to make the mirror 16 in the normal "mirror down" state (S21). After a predetermined number of pulses are counted, this motor stops (S22).

Next at step S23, the focus motor 54c is rotated backward (S23) and the time of the pulse interval associated with focus movement is compared with a predetermined value (t) (S24). If it is larger than the predetermined value, the motor stops (S25). Then the focus driver unit is reset to the initial state.

At step S26, the feeder motor 54b is rotated forward to advance the film for the next shooting (S26). When a predetermined perforation is detected (S27), the feeder motor 54b stops (S28).

Later, at step S29, the charging of flash unit 20 is started (S29).

In this embodiment of the invention, motors, particularly, stepping motors, are employed. However, it is possible to judge the operation state of a motor based on its operation time, number of turns and amount of operation angle, for example.

As described above, the present invention can provide cameras smaller than conventional ones, placing the flash illumination unit 22 of the flash unit 20 in a small space left behind the rotatable mirror 16 that is located on a front side of the light path of the triangle prism 13 in the finder optical system.

In the cameras of this structure, the mirror 16 is installed that can instantaneously switch between the finder observation light path and the flash light path when the release button is pressed down. As a result, flash light can be illuminated on the target through the finder window 11 that also serves as the flash light window.

At the same time, since the mirror 16 switches the normal finder observation light path into the flash light path, the view in the finder blacks out instantaneously and thereby the user can know this shooting moment.

Alternative Embodiment

The above described embodiment can be implemented in another way as follows. For example, the flash illumination unit 22 of the camera 1 can use any light source as far as it has a flash light source having an arc length that is small enough to be regarded as a point light source. For example, miniature light sources can be employed that can be regarded as small as a midget bulb-type light source.

Lens components and panels can be inserted between the reflector 23 of the flash unit 20 and the mirror 16 to provide preferable light distribution.

Instead of the scaling finder exemplified as a real-image mode finder, single focus finders can also be employed in the invention. The present invention can also be applied to single lens reflex cameras.

In addition, the layout of windows can be altered properly, based on the employed zooming mechanism and resulting geometry and design of each part.

Such alternative embodiments provide advantages equal to or grater than those described in the above embodiment. Having described and illustrated the principles of the invention in a preferred embodiment thereof, it is appreciated by those having skill in the art that the invention can be modified in arrangement and detail without departing from such principles.

The present invention, described with reference to associated embodiments, includes the following inventions.

A camera having a finder optical system, a flash light illumination unit and an optical system for flash light illumination, wherein part of the finder optical system also serves as the optical system for the flash light illumination, the camera having a structure in which the use of either finder or flash is permitted depending on the state of a quick return mirror mounted inside the finder optical system.

A camera having a finder optical system, a flash light illumination unit of a point light source type and an optical system for flash light illumination, wherein part of the finder optical system also serves as the optical system for the flash light illumination and a movable mechanism is installed that shuts down the light path of the finder optical system upon flash light illumination.

An optical device for use in the optical system comprising lens elements and a movable mirror, wherein in a first state of the mirror the optical system can be used as a finder optical system and in a second state of the mirror the optical system can be used as a flash optical system.

A flash unit having a mirror that instantaneously switches the finder light path to the flash light illumination path upon pressing down of the release button so that flash light can be illuminated onto a target through the finder window.

A camera that can notify the user of shooting by instantaneously blacking out the view in the finder upon pressing down of the release button.

The effects of the present invention are that the camera can notify the user of the moment of shooting and that the size of the camera can be reduced by a characteristic layout of the finder and the flash unit illuminating flash light through the finder system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera incorporating a flash light illumination device, comprising:
    a finder optical system that can change a finder view range by changing a focal length of an object lens system having a plurality of object lens groups that move along an optical axis;
    a flash light illumination unit that is located along said optical axis behind the object lens system, and that illuminates flash light on a target through the object lens system; and
    an optical path changing means that is installed along said optical axis, and that can move between: (i) a first position where said optical path changing means bends an optical path of light traveling through said finder optical system by intruding between said object lens system and said flash light illumination unit to form a finder optical path, and (ii) a second position where said optical path changing means retracts from said optical axis to enable a flash light path to be formed for the flash light to be emitted from the flash light illumination unit through the object lens system.

2. The camera according to claim 1, wherein said flash light illumination unit comprises a point light source.

3. The camera according to claim 1, wherein said optical path changing means comprises a movable reflector.

4. A camera incorporating a flash light illumination device comprising:
    a finder optical system that can change a finder view range by changing a focal length of an object lens system having a plurality of object lens groups that move along an optical axis; and
    a flash light illumination unit that is located along said optical axis behind the object lens system, and that illuminates flash light on a target through the object lens system;
    wherein said finder optical system is a real-image mode finder that has an image forming plane in a predetermined position on a finder optical path where a real image of a target is formed, and
    wherein said flash light illumination unit is located along said optical axis at a position almost equivalent to the predetermined position of said image forming plane with regard to a length of said finder optical path.

5. The camera according to claim 4, wherein said flash light illumination unit comprises a point light source.

6. The camera according to claim 4, wherein said flash light illumination unit comprises a light source whose arc length is short enough to be regarded as a point light source.

7. The camera according to claim 4, wherein said flash light illumination unit comprises a midget bulb light source.

8. A camera incorporating a flash light illumination device comprising:
    a finder optical system having an object lens system and an eyepiece lens system;
    a reflector that is located along an optical axis of said object lens system behind said object lens system, and that guides light beams emitted from a target to said eyepiece lens system by reflecting and refracting incident light beams; and
    a flash light illumination unit that is located along said optical axis of said object lens system behind said reflector, and that can illuminate flash light onto the target through said object lens system.

9. The camera according to claim 8, wherein said flash light illumination unit is located along said optical axis of the object lens system at a position near to where an image of the target is formed.

10. The camera according to claim 9, wherein said object lens system comprises a plurality of object lens groups that move along said optical axis, and said finder optical system can change a finder view range as desired by changing a focal length of the object lens system, the finder optical system being a real-image based scaling finder having a real image plane where a real image of the target is formed in a predetermined position on an optical path of the finder optical system.

11. The camera according to claim 9, wherein said flash light illumination unit comprises a light source whose arc length is short enough to be regarded as a point light source.

12. The camera according to claim 10, wherein said flash light illumination unit comprises a point light source.

13. The camera according to claim 10, wherein said flash light illumination unit comprises a midget bulb light source.

14. The camera according to claim 8, wherein said reflector is installed along said optical axis of said object lens system, and said reflector can between (i) a first position where the reflector bends an optical path of light traveling through said finder optical system by intruding between said object lens system and said flash light illumination unit to form a finder optical path, and (ii) a second position where the reflector retracts from said optical axis of said object lens system to enable a flash light path to be formed for the flash light to be emitted from the flash light illumination unit through the object lens system.

15. A camera having a flash light illumination unit comprising:
    a real-image based scaling finder optical system that can change a finder view range as desired and that has an image forming plane on a finder optical path;
    a flash light illumination unit that illuminates flash light; and
    an object lens system that is installed forward of said flash light illumination unit and that directs the flash light emitted from said flash light illumination unit with an illumination angle suitable for shooting the target,
    wherein said object lens system also serves as part of said finder optical system and is located in a position almost equivalent to a position of said image forming plane of said finder optical system.

16. The camera according to claim 15, wherein said flash light illumination unit comprises a point light source.

17. The camera according to claim 15, further comprising an optical path changing means that is installed along an optical axis of said object lens system, and that can move between: (i) a first position where the optical path changing means bends an optical path of light traveling through said finder optical system by intruding in front of said flash light illumination unit to form a finder optical path, and (ii) a second position where the optical path changing means retracts from said optical axis to enable a flash light path to be formed for the flash light to be emitted from the flash light illumination unit through the object lens system.

* * * * *